UNITED STATES PATENT OFFICE.

JOHN D. EDMISTON, OF CAVE SPRINGS, ARKANSAS, ASSIGNOR TO HOMER H. DUNLAP, OF OKLAHOMA, OKLAHOMA.

ELASTIC CEMENT.

1,122,883. Specification of Letters Patent. Patented Dec. 29, 1914.

No Drawing. Application filed October 6, 1913. Serial No. 793,680.

*To all whom it may concern:*

Be it known that I, JOHN D. EDMISTON, a citizen of the United States, residing at Cave Springs, in the county of Benton and State of Arkansas, have invented certain new and useful Improvements in Elastic Cement; and I do declare the following to be a full, clear, and exact description of the invention, such as will enable others skilled in the art to which it appertains to make and use the same.

This invention relates to improvements in silo coating or elastic cement especially designed as a filler.

The object of the invention is to provide a composition of this character which will tightly close spaces in or between solid substances such as wood, steel or iron and which will form an air or water-tight lining or covering when applied rendering it especially useful in the erection of silos.

This cement is composed of gilsonite 8%, with variation of from 2 to 15%, rosin 2%, with variation of from ¼ to 16%, graphite 8% with variation of from 2 to 15%, pine creosote oil 15%, with variation of from 2 to 30%, petroleum residue 42%, with variation of from 15 to 50%, asbestos 25%, with variation of from 10 to 50%.

In preparing the cement compound the gilsonite and the rosin are placed together in a tank and cooked. The oils are then added, then the graphite and last while the mixture is still warm the asbestos, the ingredients all being thoroughly commingled.

The cement formed by the combining and cooking together of the above mentioned ingredients is designed to be used as a filler for filling cracks or joints or openings of any kind between solid substances, either wood, steel, iron or other metals and is especially designed as a lining or coating for silos and when applied completely shuts out all moisture and air thereby rendering the silo both air and waterproof. It will be obvious that while I have specified its use as applied to silos that it may be employed for a great many other purposes.

I claim as my invention:

An elastic cement consisting of gilsonite 8%, rosin 2%, graphite 8%, pine creosote oil 15%, petroleum residue 42% and asbestos 25%.

In testimony whereof I have hereunto set my hand in presence of two subscribing witnesses.

JOHN D. EDMISTON.

Witnesses:
J. W. HURD,
J. E. SMITH.